United States Patent [19]

Sarakas

[11] Patent Number: 4,937,854
[45] Date of Patent: Jun. 26, 1990

[54] CALL SCREENING DEVICE

[76] Inventor: Stephen T. Sarakas, 345 Misty Valley Dr., St. Peters, Mo. 63376

[21] Appl. No.: 318,659

[22] Filed: Mar. 3, 1989

[51] Int. Cl.$^5$ .............................................. H04M 1/66
[52] U.S. Cl. .................................... 379/199; 379/188
[58] Field of Search ................. 379/188, 199, 200, 373

[56] References Cited

U.S. PATENT DOCUMENTS

| | | | |
|---|---|---|---|
| 4,393,278 | 7/1983 | Miyoshi | 379/199 |
| 4,674,115 | 6/1987 | Kaleita et al. | 379/199 X |
| 4,791,664 | 12/1988 | Lutz et al. | 379/199 |
| 4,827,501 | 5/1989 | Hansen | 379/199 |

*Primary Examiner*—James L. Dwyer
*Attorney, Agent, or Firm*—Senniger, Powers, Leavitt and Roedel

[57] ABSTRACT

A call screening device is disclosed for use with a telephone system including one or more telephones connected to outside telephone service in order to screen incoming call signals directed to the telephone system and for providing, in response to a preselected security code signal, the incoming call signals to the telephones. The call screening device includes circuitry for storing the preselected security code signal and for receiving the incoming call signal and an incoming code signal from the outside telephone service. Circuitry is provided for comparing the incoming code signal with the preselected security code signal and for providing the call signal to one or more telephones when the comparing circuitry determines the incoming code signal corresponds to the preselected security code signal. The device may be activated or deactivated in response to a preselected control signal from any of the telephones. The device also includes circuitry for providing a ringing signal to each of the telephones during a period beginning with determination by the comparator circuitry that the incoming code signal received by the receiver circuitry corresponds to the preselected security code signal and ending with termination of the incoming call signal or answering of any one of the telephones, whichever occurs first.

19 Claims, 7 Drawing Sheets

CALL SCREENING DEVICE

BACKGROUND OF THE INVENTION

This invention relates in general to a telecommunication device and in particular to a call screening device for a telephone system.

Various methods and devices have been used to avoid unwanted phone calls. One method telephone subscribers have resorted to is not listing their telephone numbers in published telephone directories. However, with the advent of automatic electronic calling equipment, unlisted telephone numbers do not provide full security against unwanted phone calls.

Another method of avoiding unwanted calls is to use a telephone call screening device. Essentially, these devices are special purpose computers which automatically control incoming telephone calls. A person who places a call to a receiving party's telephone line connected to a call screening device will be requested by the device to enter a security code. If the person calling enters the correct security code, the device will indicate to the receiving party that an incoming call is present to be answered. Anyone who calls the number and fails to enter the correct security code within a preselected time period will be disconnected. In this way, the receiving party avoids answering nuisance calls, obscene calls, wrong numbers or any other callers who do not have the correct security code.

A disadvantage associated with prior call screening devices is that they can be connected to only one telephone at a time. If a telephone system has more than one telephone, the user will have to return to the telephone connected to the device to answer an incoming call. Furthermore, prior call screening devices generate a ringing signal themselves and do not activate the ringers in the telephones. If a user is away from the call screening device, the user may not hear the ringing of the call screening device and thus would miss an authorized call. Moreover, these users must return to the call screening device in order to activate or deactivate the device.

SUMMARY OF THE INVENTION

Among the several objects of the invention are the provision of a call screening device for monitoring incoming calls from outside telephone service to a telephone system and determining whether each incoming call is from an authorized caller; the provision of such a call screening device which can be located remote from the telephones in the system; the provision of such a call screening device which may be activated and deactivated remotely from the call screening device by any telephone in the system; the provision of such a call screening device which will ring all the telephones in the system when an incoming call is received from an authorized caller; the provision of such a call screening device which is easily and conveniently installed in an existing telephone system; and the provision of such a call screening device which is simple in circuitry, economical, and reliable in operation.

In general, one embodiment of the invention is a call screening device for use with a telephone system including one or more telephones connected to outside telephone service in order to screen incoming call signals directed to the telephone system and for providing, in response to a preselected security code signal, the incoming call signals to the telephones. The call screening device includes memory means for storing the preselected security code signal, receiver means for receiving the incoming call signal and an incoming code signal from the outside telephone service. The device also includes comparator means for comparing the incoming code signal received by the receiver means with the preselected security code signal stored in the memory means, and switching means, responsive to the comparator means, for providing the incoming call signal to one or more telephones when the comparator means determines the incoming code signal received by the receiver means corresponds to the preselected security code signal stored in the memory means.

In another embodiment, the invention also comprises a call screening device for use with a telephone system including one or more telephones connected to outside telephone service in order to screen incoming call signals directed to the telephone system and for providing, in response to a preselected security code signal, the incoming call signals to the telephones. The call screening device includes memory means for storing the preselected security code signal, receiver means for receiving the incoming call signal and an incoming code signal from the outside telephone service, and comparator means for comparing the incoming code signal received by the receiver means with the preselected security code signal stored in the memory means. The device also includes switching means, responsive to the comparator means, for providing the incoming call signal to one or more telephones when the comparator means determines the incoming code signal received by the receiver means corresponds to the preselected security code signal stored in the memory means. The device further includes ringing means, responsive to the incoming call signal, for providing a ringing signal to each of the telephones during a period beginning with determination by the comparator means that the incoming code signal received by the receiver means corresponds to the preselected security code signal stored in the memory means and ending with termination of the incoming call signal or answering of any of the telephones, whichever occurs first.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF PREFERRED EMBODIMENTS

Figure 1:
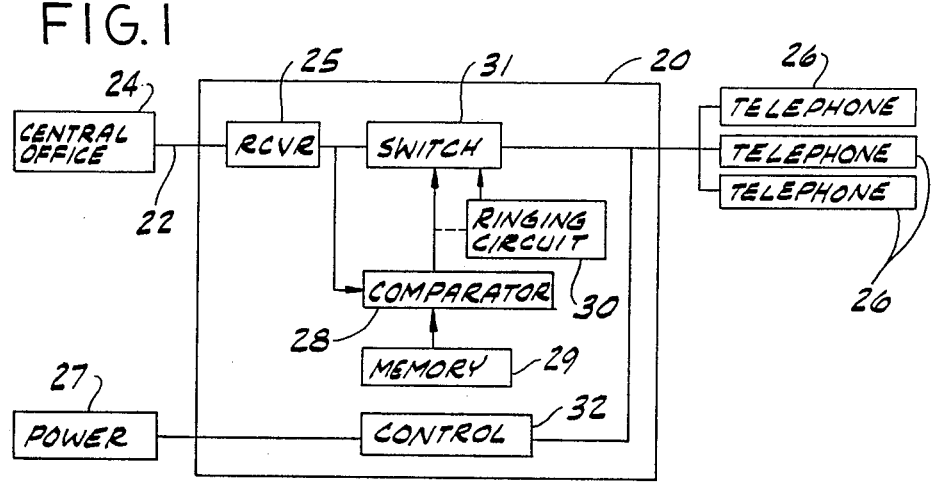
FIG. 1 is a block diagram of the call screening device of the present invention shown connected to a telephone system.

A call screening device of the present invention, indicated generally as 20 in the figures, is shown in FIG. 1 as connected to a telephone line 22 which is in turn connected to a central office 24 or other intermediate point along a path from the central office 24. Telephone calls are transmitted over the telephone line 22 and received by receiver 25 of the call screening device 20, to be provided to one or more telephones 26 under certain conditions. When the device 20 is on and connected to power 27, an incoming call will be directed to the device 20 and a caller will be requested to provide a security code number. The incoming security code signal entered by the caller is compared by comparator 28 to a preselected security code signal stored in memory 29 by the receiving party by ten position switches as noted below. If the incoming signal corresponds to the preselected signal, comparator 28 activates ringing circuit 30 to ring all of the telephones. Comparator 28 also closes switch 31 to connect the incoming call signal to the telephones 26. If the device 20 is off, switch 33 is normally closed so that an incoming call will be routed to all of the telephones 26 in the same manner as if the device 20 was not connected to the telephone line 22. Power 27 is selectively supplied to device 20 via control 32 which is responsive to a preselected control signal provided by the receiving party via any of the telephones 26 as noted below. Although FIG. 1 illustrates device 20 connected between all telephones 26 and line 22, it can be connected at any point in the telephone system to one or more telephones.

As is known, each telephone 26 includes a handset which is placed in a cradle of a base of the telephone 26 to disconnect the telephone 26 from the telephone line 22 when the telephone 26 is not in use. This is referred to as an on hook condition. When a phone call is initiated or answered the handset is lifted from the cradle. This connects the telephone 26 to the telephone line 22. This is referred to as an off hook condition. Inside the base is a ringer which is operated to audibly signal an incoming call. The base also includes a dial pad having keys and the keys for producing dual tone multifrequency (DTMF) signals.

Device 20 generates at least seventeen signals which are tabulated below:

TABLE I

| Signal | Description |
| --- | --- |
| CTRL | When handset is lifted as though to place a call, and a call is not being answered, CTRL goes high upon releasing 8 when and if it was the first digit pressed and if it was held for 3 seconds or more |
| DVUP | High as long as a legitimate DTMF signal is being received |
| PKUP | A pulse which is generated upon lifting the handset when a call is not being answered |
| TFHD | High upon lifting the handset to answer a call, during either the 2 seconds ringing period or the 4 seconds silent period |
| ONOF | High when the device is on |
| DPDT | Operates a relay which switches the phones from the device to the phone line |
| HOOK | High while phone is off hook and connected to the phone line |
| RSTA | A pulse produced at the end of a ring detection |
| CALL | High for a predetermined period of time beginning with the end of a first ring detection |
| CODE | High upon receipt of a four digit code signal |
| SUMN | Operates a branch relay after a phone is lifted |

TABLE I-continued

| Signal | Description |
| --- | --- |
| | off hook |
| AYTE | High as long as a digit 8 DTMF signal is being received |
| RCVE | Operates a branch relay during incoming call interception |
| DIAL | High while 350 Hz and 440 Hz dial tone pair is being detected |
| SHOS | Analog signals to and from a secondary of a 600 ohm coupling transformer |
| ROSC | 20 Hz square wave which switches a ringing generator |
| RING | Begins a 2 seconds ringing period and a 4 seconds silent period after a four digit code is received |

Figure 2A:
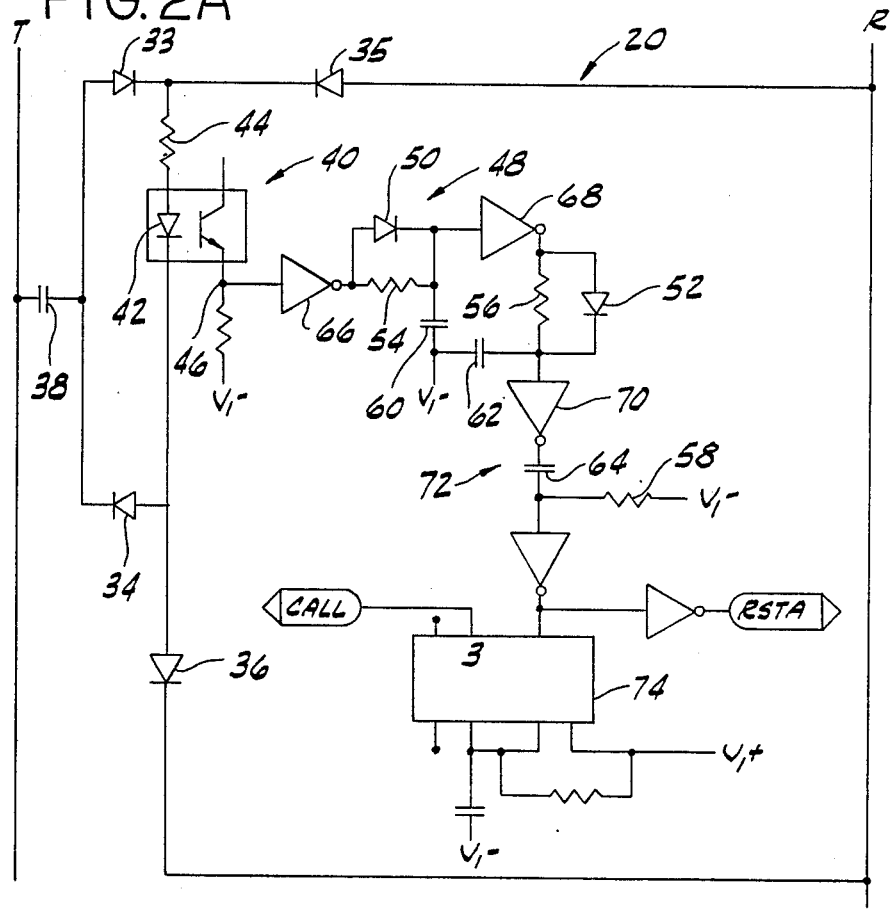
FIGS. 2A-2C are successive portions of a schematic diagram of the call screening device shown in FIG. 1.
Figure 2B:
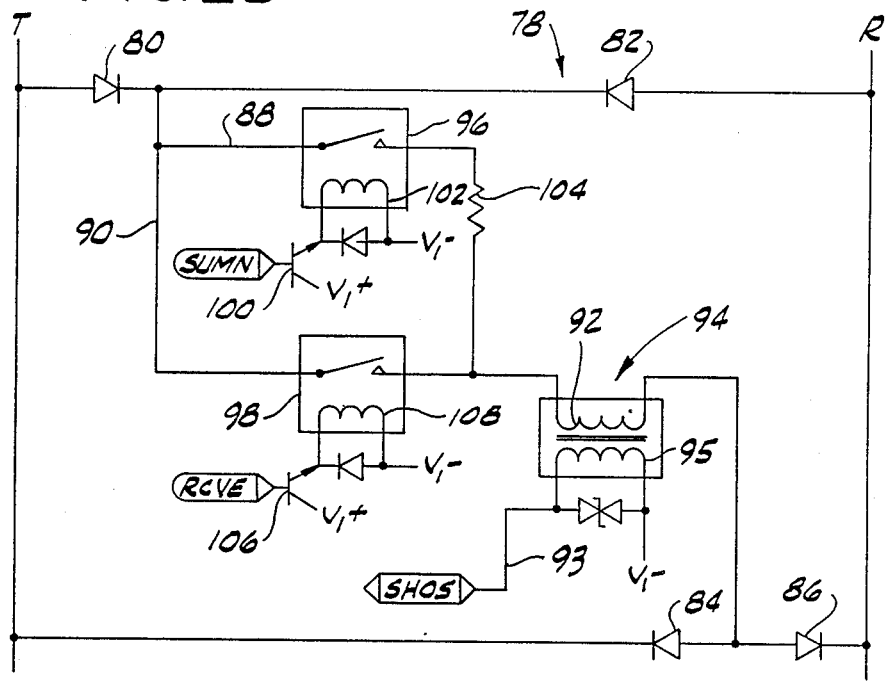
Figure 2C:
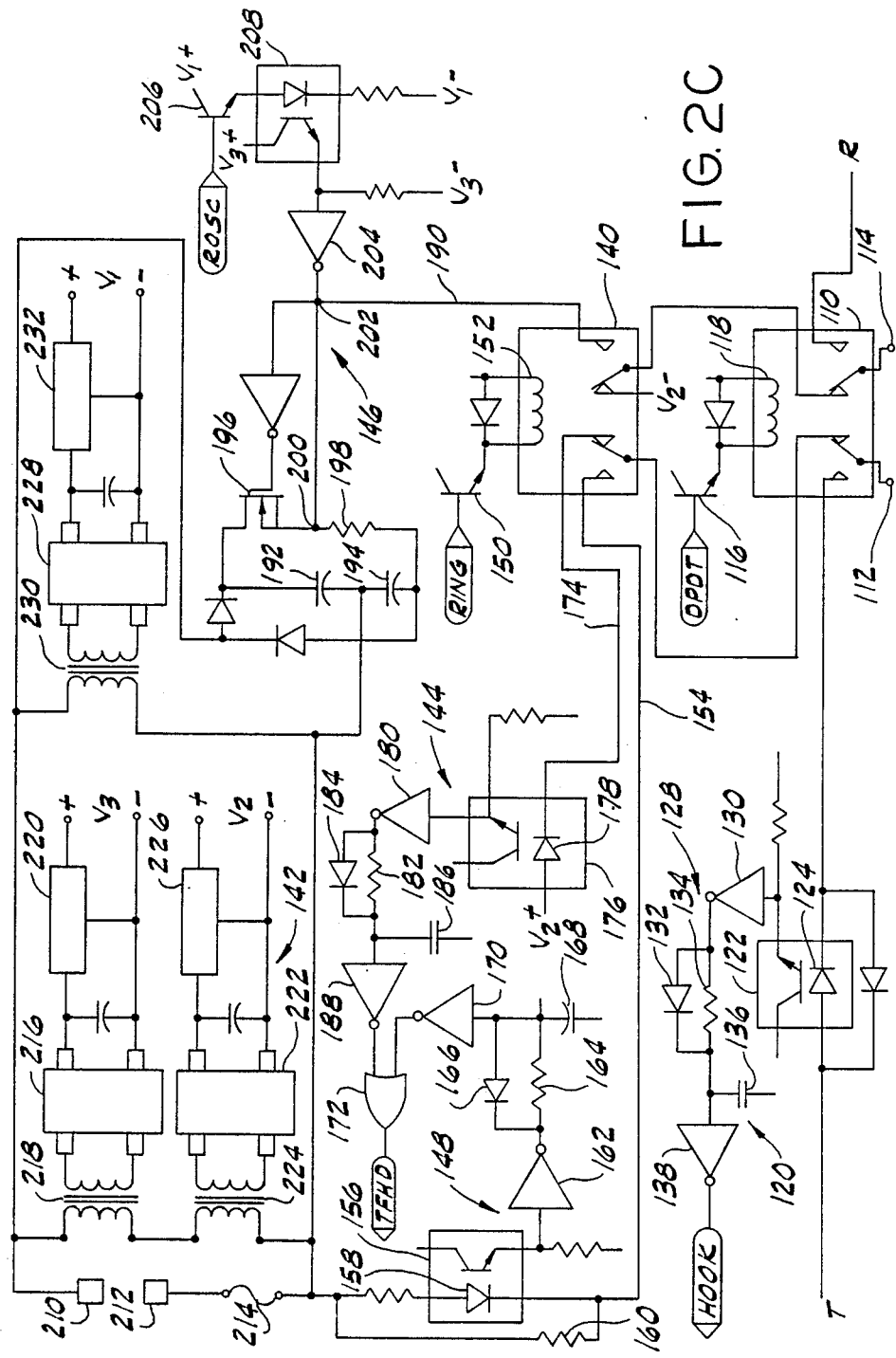

FIGS. 2A-2C show a schematic diagram of the call screening device 20 shown in FIG. 1. Device 20 is connected to telephone line 22 by two terminals T (tip) and R (ring)(See FIG. 2A). A full wave bridge rectifier comprising diodes 33, 34, 35, and 36 is coupled across terminals T and R by a capacitor 38. Within the bridge 28 is an optoisolator 40 having a photodiode portion 42 which is current limited by a resistor 44. The output of optoisolator 40 appears at a node 46 and is connected to a circuit 48 which converts the output of optoisolator 40 to a high logic signal when an incoming call signal is being received over the telephone line 22. Circuit 48 is comprised of diodes 50 and 52, resistors 54, 56, and 58, capacitors 60, 62, and 64, and inverters 66, 68, and 70. Circuit 48 also traps single pulses that occur as transients. At the end of the first incoming call signal ringing period a half-monostable timer circuit 72 creates a short low pulse which triggers a monostable circuit 74, such as type number 555. Monostable circuit 74 generates an output signal CALL at pin 3 beginning at the end of the first call signal ringing period. Additionally, circuit 72 produces the RSTA signal.

A full wave bridge rectifier 78 comprising diodes 80, 82, 84, and 86 is placed across terminals T and R (see FIG. 2B). Within the bridge 78 are two parallel paths 88 and 90 which are connected to a primary winding 92 of a 600 ohm audio transformer 94 by a pair of single pole single throw (spst) relays 96 and 98. An SHOS signal is transmitted and received over a line 93 connected to a secondary winding 95 of the transformer 94. A transistor 100 operates a coil 102 of the relay 96 to switch the relay 96 when the handset is lifted off hook to initiate an outgoing phone call or to turn the device 20 on or off. A resistor 104 is in series with the relay 96 to prevent the voltage across path 88 from falling to a level that would prevent any of the telephones 26 from generating DTMF signals when the handset is lifted off hook. A transistor 106 operates a coil 108 of the relay 98 to switch the relay 98 when the handset is lifted off hook to answer an incoming call. Only one of the relays 96 and 98 is closed at a time. When an incoming call is being received relay 96 is opened and relay 98 is closed. Also, when the handset is lifted off hook to initiate an outgoing call or to turn the device 20 on or off relay 98 is opened and relay 96 is closed.

A double pole double throw (DPDT) switch means such as relay 110 is connected across terminals T and R (see FIG. 2C). Relay 110 is also connected to the user's telephones 26 at terminals 112 and 114. When the device 20 is operated to screen incoming calls relay 110 isolates the telephones 26 from terminals T and R. However, when the device 20 is off relay 110 connects the telephones 26 to terminals T and R. A transistor 116 operates a coil 118 of the relay 110. Transistor 116 is controlled by the DPDT signal.

A hook detector circuit 120 is connected between terminal T and relay 110 to detect when the handset is lifted off hook when the device 20 is off and also to detect when the handset is returned to the cradle in the on hook position after a screened call has been completed. The hook detector circuit 120 includes an optoisolator 122 having a photodiode 124 forward biased with respect to the loop current flowing through terminal T. A diode 126 is connected in parallel with photodiode 124 and is oppositely biased to photodiode 124. Diode 126 is a control which permits the passage of ringing current when the device 20 is off. The output of optoisolator 122 is connected to a circuit 128 which includes an inverter 130, a diode 132, a resistor 134, a capacitor 136, and an inverter 138 to generate the HOOK signal.

Also connected to relay 110 is a second DPDT relay 140 which switches relay 110 from a power supply 142 and a four second hook detector circuit 144 to a ringing generator 146 and a two second hook detector circuit 148. A transistor 150 operates a coil 152 of the relay 140. Transistor 150 is controlled by the RING signal. The two second hook detector circuit 148 is connected to relay 140 via a line 154. The two second hook detector circuit 148 includes an optoisolator 156 having a diode 158 and a resistor 160 connected in parallel with optoisolator 156. The output of the optoisolator 156 is supplied to an inverter 162 and then to a resistor 164 connected in parallel with a diode 166. This signal is filtered by a capacitor 168 and supplied to an inverter 170. The output of the inverter 170 is provided to an OR gate 172.

The four second hook detector circuit 144 is connected to relay 140 via a line 174. The four second hook detector circuit 144 includes an optoisolator 176 having a diode 178. The output of the optoisolator 176 is supplied to an inverter 180 and then to a resistor 182 connected in parallel with a diode 184. This signal is filtered by a capacitor 186 and supplied to an inverter 188. The output of the inverter 188 is provided to the OR gate 172.

The ringing generator 146 is connected to the relay 140 via a line 190. The ringing generator 146 includes a pair of capacitors 192 and 194 in parallel with a MOSFET transistor 196 in series with a power resistor 198. The MOSFET 196 and the resistor 198 invert the voltage signal from the capacitors 192 and 194 at a junction 200. For example, if the capacitors 192 and 194 generate a voltage signal of 345 volts then the voltage signal at junction 200 when the MOSFET 196 is switched on is 345 volts or the voltage signal at junction 200 when the MOSFET 196 is switched off is −345 volts. The voltage signal at junction 200 is also supplied to a junction 202. The voltage signal at junction 202 is switched by the output of an inverter 204. The ROSC signal controls the switching of a transistor 206. The output of transistor 206 is supplied to an optoisolator 208 which is connected to the inverter 204.

Additionally, the device 20 is connected to an AC outlet at terminals 210 and 212. A fuse 214 is connected in series with terminal 212. A full wave bridge 216 is connected to an AC transformer 218 is used to power a power supply 220 for developing the voltage required for switching the ringing generator 146. A second full wave bridge 222 is connected to a second AC transformer 224 to power a power supply 226 for supplying voltage to relay 140. A third full wave bridge 228 is connected to an AC transformer 230 to power a power supply 232 which develops the voltage required for the device 20.

Figure 3:
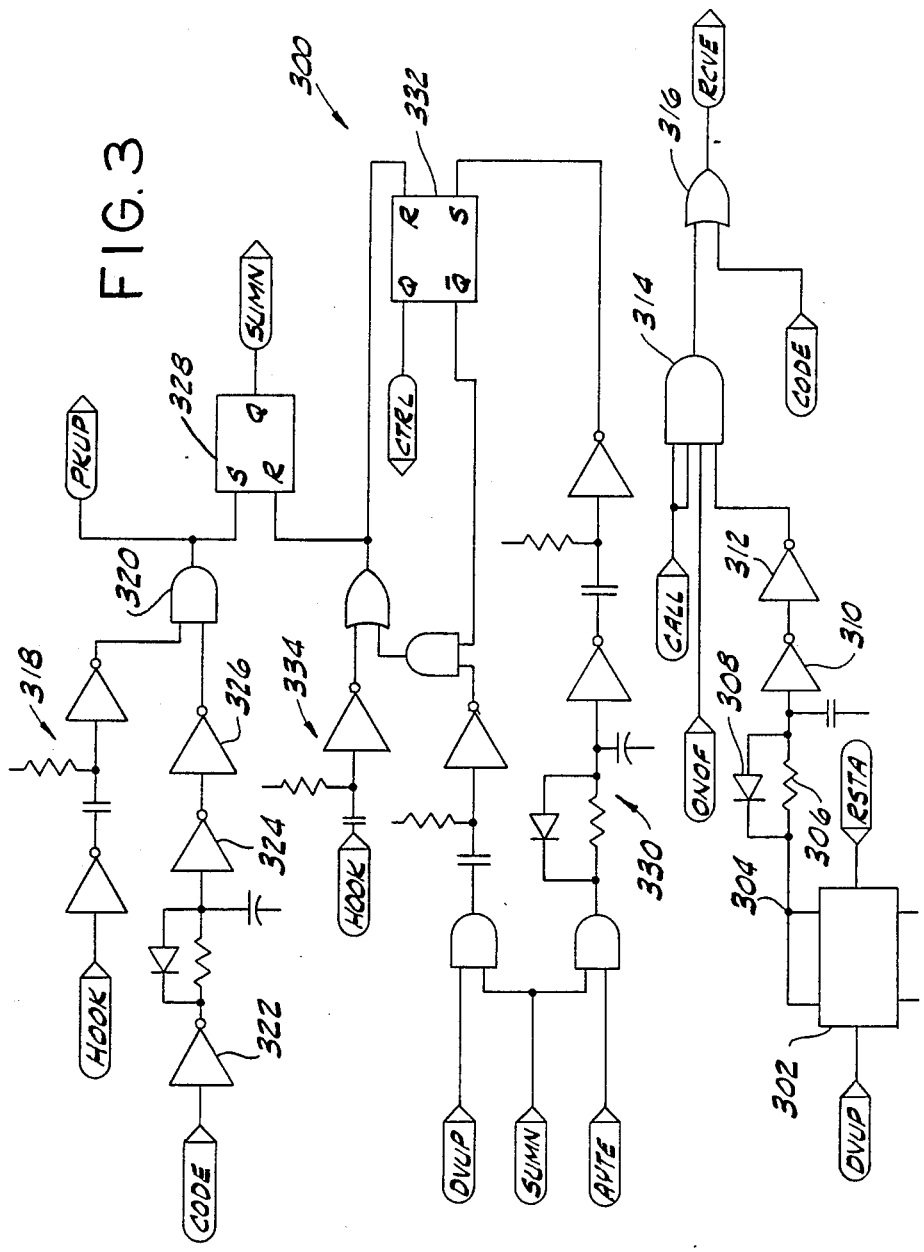
FIG. 3 is a schematic diagram of a branch control circuit used in the call screening device of FIG. 2.

FIG. 3 shows a branch control circuit 300 which generates the SUMN and the RCVE signals for switching relays 96 and 98, respectively. At the end of a first ring detection the RSTA signal resets a counter 302 and its output goes low. The output of counter 302 appears at a junction 304 and is connected to a resistor 306, a diode 308 in parallel with resistor 306, and a pair of series connected inverters 310 and 312. The output of inverter 312 is supplied to an AND gate 314. AND gate 314 also has the CALL signal and the ONOF signal as its other inputs. The output of AND gate 314 is provided to an OR gate 316. The CODE signal is connected to another input of OR gate 316. If the device 20 is on, the ONOF signal is high and the RCVE signal, the output of OR gate 316, also goes high. If the CODE signal goes high prior to the expiration of the timing period RCVE will be held high by CODE at the OR gate 316.

When the phone 26 is lifted off hook, the HOOK signal becomes high and a half-monostable timer circuit 318 produces a pulse which is sent to an AND gate 320. AND gate 320 generates the PKUP signal if a call is not being answered. If a call is being answered the CODE signal is inverted by inverters 322, 324, and 326 to cause the output of AND gate 320 to go low.

The output of AND gate 320 is also connected to a SR flip-flop 328. SR flip-flop 328 generates the SUMN signal which operates relay 96. Additionally, once relay 96 is closed, the device 20 may receive DTMF signals. If the first digit pressed is not an 8 held for 3 seconds or longer, flip-flop 328 will be reset upon the release of the digit pressed which causes SUMN to go low. However, if the first digit pressed is an 8 held for 3 seconds or longer a half-monostable timer circuit 330 generates a pulse which sets a SR flip-flop 332. Flip-flop 332 generates the CTRL signal at its Q output. After flip-flop 332 is set and CTRL is high, the second digit pressed may be used to turn the device 20 on or off. Both flip-flops 328 and 332 are reset by a pulse from a half-monostable timer circuit 334 when the HOOK signal goes low.

Figure 4:
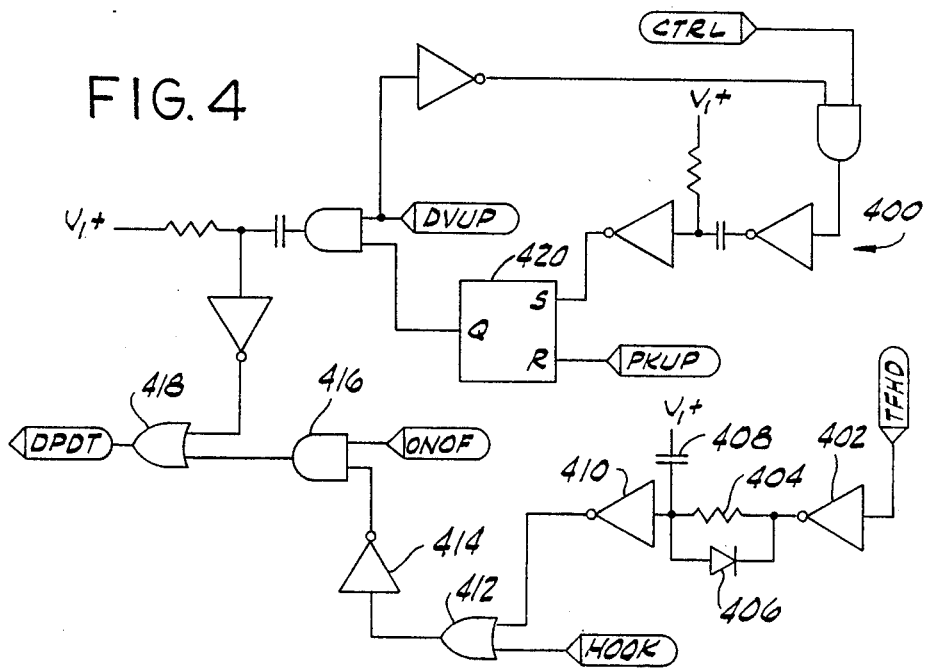
FIG. 4 is a schematic diagram of an DPDT control circuit used in the call screening device of FIG. 2.

Referring to FIG. 4, a DPDT control circuit 400 is illustrated. The TFHD signal is supplied to an inverter 402. The output of inverter 402 is delayed by a resistor 404, a diode 406, and a capacitor 408. The delayed output is provided to an inverter 410 with its output supplied to an OR gate 412. The HOOK signal is supplied to another input of OR gate 412. The output of OR gate 412 is connected to an inverter 414 with its output supplied to an AND gate 416. The AND gate 416 also has the ONOF signal as another input. The output of AND gate 416 is connected to an OR gate 418 which generates the DPDT signal for operating relay 118.

The HOOK signal and the TFHD signal are combined by OR gate 412. When both the HOOK signal and the TFHD signal are low, inverter 414 inverts this signal and a high ONOF signal forces AND gate 416 high. The DPDT signal is now high and relay 118 is operated to disconnect the phone 26 from the phone line 22 and to connect the phone 26 to the device 20. If the phone 26 is lifted off hook, the TFHD signal will go high and is delayed going low again to compensate for the contact travel time of relay 118. If device 20 is off, the ONOF signal is low and the phone 26 is connected to the phone line 22 at all times.

When the CTRL signal goes high, upon releasing the second digit which may be actuated to switch device 20 on or off, the phone 26 is momentarily disconnected from the phone line 22. A SR flip-flop 420 is reset by the PKUP signal when relay 118 reconnects the phone 26 to the phone line 22 or whenever the phone 26 is lifted off hook.

Figure 5:
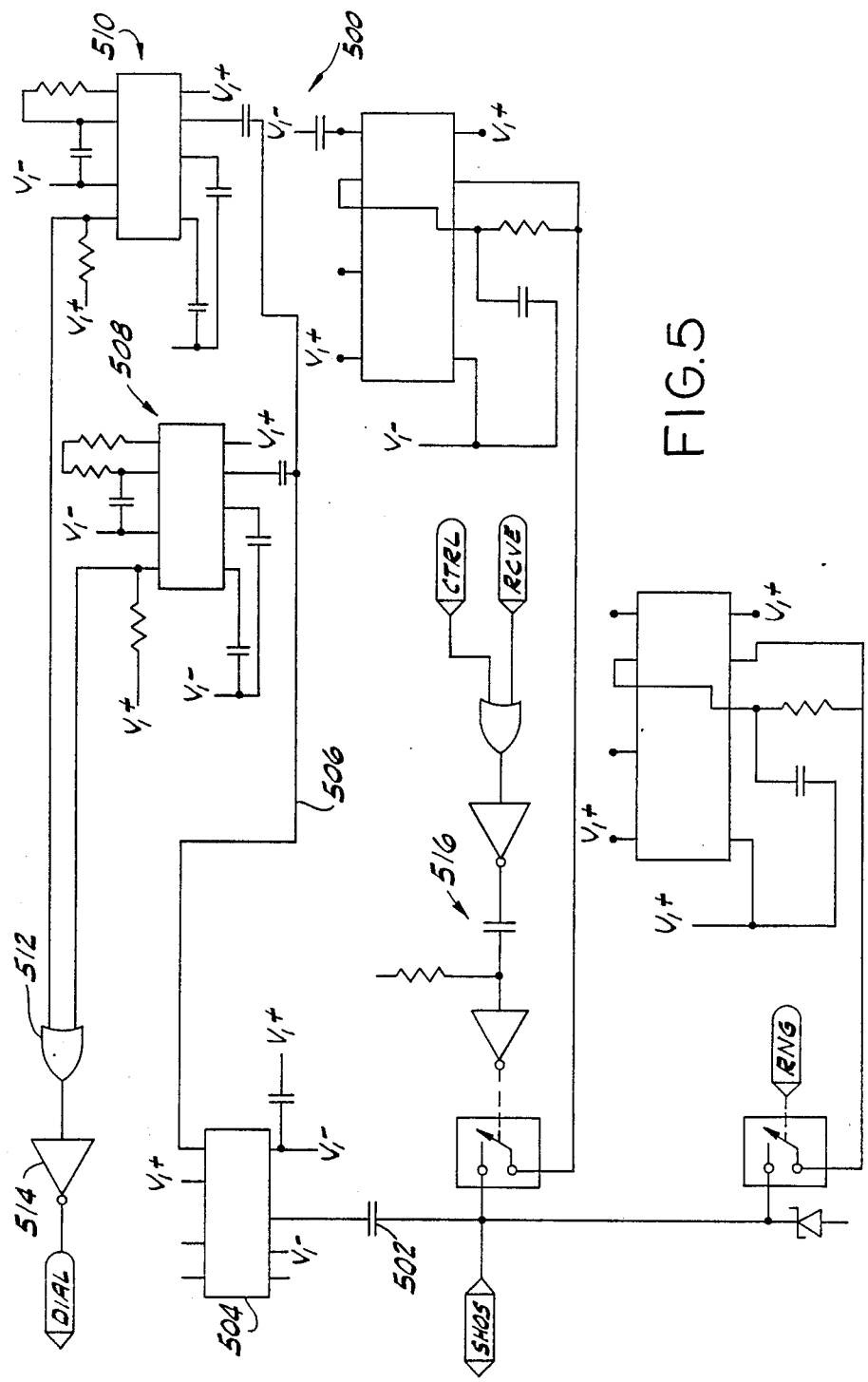
FIG. 5 is a schematic diagram of a signal set circuit used in the call screening device of FIG. 2.

A circuit 500 for generating the DIAL signal is illustrated in FIG. 5. Analog signals from the secondary 95 of transformer 94 are coupled through a capacitor 502 to an input of an audio amplifier 504. The output of audio amplifier 504 is supplied via a line 506 to a pair of tone decoder phase-locked loops 508 and 510. The tone decoders 508 and 510 are used to detect the 350 Hz. and 440 Hz. dial tone pair. The output of tone decoder 510 goes low when the 350 Hz. tone is detected and the output of tone decoder 508 goes low when the 440 Hz. tone is detected. The outputs of tone decoders 508 and 510 are supplied to an AND gate 512 with the output of AND gate 512 connected to an inverter 514. Inverter 514 generates the DIAL signal.

Signals to the secondary 95 of transformer 94 include an invitational tone and a ringback tone. The ringback tone is applied simultaneously with the actual ringing in a 2 seconds on and 4 seconds off cycle. The invitational tone is applied in a short pulse which is generated by a half-monostable timer circuit 516 when the CTRL signal or the RCVE go high.

Figure 6:
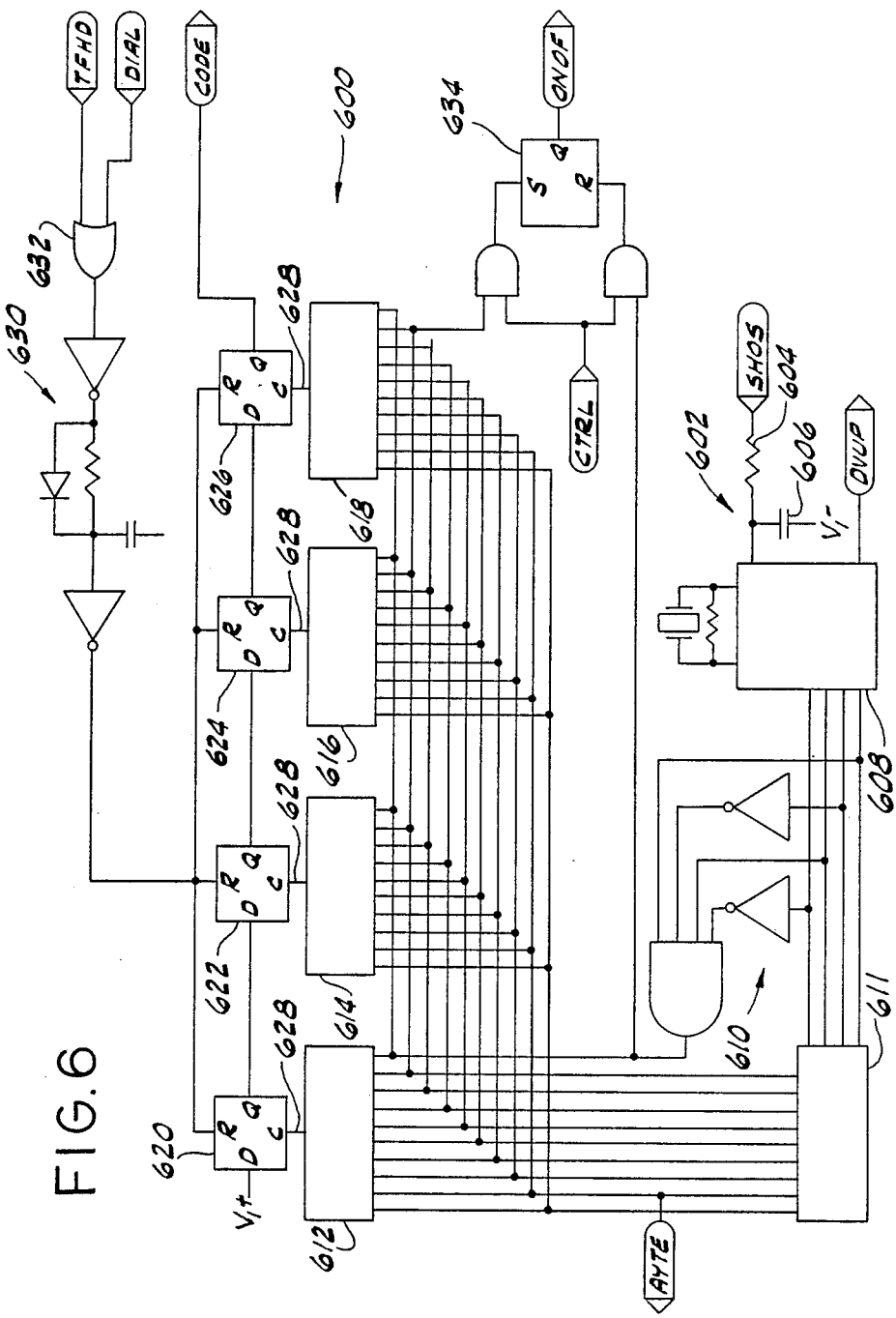
FIG. 6 is a schematic diagram of a sequencer circuit used in the call screening device of FIG. 2.

Referring now to FIG. 6 a schematic diagram of a comparator circuit 600 for generating the CODE signal which represents that the correct incoming security code signal has been entered by a caller is shown. The SHOS signal is fed through a low pass filter 602 comprising a resistor 604 and a capacitor 606 to a decoder circuit 608. The binary coded output of the decoder 608 is converted to a one-of-ten output by a converter circuit 610, which may include a 4028 type converter 611. The one-of-ten outputs are supplied to four ten position switches 612, 614, 616, and 618. Four D flip-flops 620, 622, 624, and 626 receive a clock pulse through each common input 628 connected to each of the ten position switches 612-618. When the incoming code signal corresponds to the preselected security code signal represented by the positions of the switches 612-618, the CODE signal goes high at the output of flip-flop 626. The flip-flops 620-626 are reset by a pulse generated by a half-monostable edge detector circuit 630. The DIAL signal and the TFHD signal are supplied to the inputs of an OR gate 632 in circuit 630. When dial tone is received after a caller hangs up or if the handset is lifted to answer a call the flip-flops 620-626 are reset. The decoded digits 0 and 1 when combined with the CTRL signal are used to set or reset a SR flip-flop 634. Flip-flop 634 generates the ONOF signal at its Q output.

Figure 7:
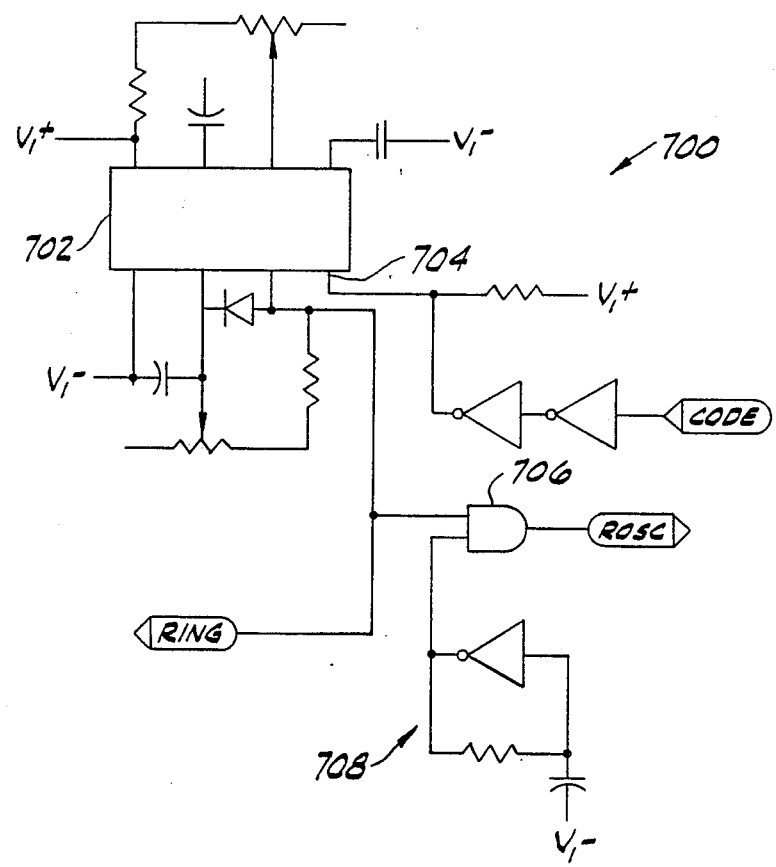
FIG. 7 is a schematic diagram of a two-four timer circuit used in the call screening device of FIG. 2.

FIG. 7 illustrates a schematic diagram of a two-four timer circuit 700 for ringing the phones 26 after the correct incoming security code signal has been received. A counter 702 begins to count in a cycle of on for two seconds and off for four seconds when counter 702 receives a high signal at an input 704 from the CODE signal indicating that the correct security code has been entered by a caller. The counter 702 generates the RING signal which operates relay 140 which switches the phone 26 from the four second hook detector circuit 144 to the ringing generator 146 and the two second hook detector circuit 148. The RING signal is also supplied as an input to an AND gate 706. An output of a 20 Hz. astable circuit 708 is supplied as another input to AND gate 706. The AND gate 706 generates the ROSC signal which switches the ringing generator 146 at 20 Hz.

In order to operate the device 20, it is connected to the phone line 22, one or more phones 26, and a power source 27. When connected, the device 20 is initially off and incoming phone calls ring the phones 26 because relay 110 is switched to connect T and R to terminals 112 and 114. The four digit security code is selected by setting four thumbwheel switches (not shown) of switches 612-618. In order to turn the device 20 on, the handset is lifted off hook and a first key on the keypad is actuated, for example the numeral 8 key, and held for three seconds or more causing the AYTE signal to go high. Upon release of the first key, a second key such as the numeral 1 key is pressed causing relay 110 to switch terminals 112 and 114 to the device 20 to activate the device 20 for incoming calls to be screened. If the device 20 is activated it may be deactivated by pressing the first key and a third key, for example the numeral 0 key, to cause relay 110 to switch the T and R terminals to terminals 112 and 114.

After the device 20 is activated or deactivated, the phone 26 will be momentarily disconnected and then dial tone will be restored. An outgoing call may then be placed. With the device 20 deactivated incoming calls will be sent to each of the phones 26. Alternately, with the device 20 activated incoming calls will be automatically answered by the device 20 without ringing the phones 26.

When an incoming call is received by the device 20, an audible signal will be generated over line 22 to alert a caller that the four digit preselected security code signal must be entered at this time. A time period, for example ten seconds, is timed by the device 20 during which the security code must be entered. If the security code is not entered within the time period, the call will be disconnected. If an incorrect security code is entered the call will be disconnected upon entering the fourth digit even prior to the expiration of the time period. When the correct security code has been entered the device 20 will ring each of the phones 26 because relay 110 switches terminals 112 and 114 to terminals T and R. Additionally, if the caller hangs up after the correct security code has been entered but before one of the phones 26 is answered, the device 20 will cease ringing the phones 26.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A call signal screening device for use with a telephone system including one or more telephones connected to outside telephone service in order to screen incoming call signals directed to the telephone system and for providing, in response to a preselected security code signal, the incoming call signals to the telephones, the device comprising:

memory means for storing the preselected security code signal;

receiver means for receiving the incoming call signal and an incoming code signal from the outside telephone service;

comparator means for comparing the incoming code signal received by the receiver means with the preselected security code signal stored in said memory means;

switching means, responsive to the comparator means, for providing the incoming call signal to one or more telephones when the comparator means determines the incoming code signal received by the receiver means corresponds to the preselected security code signal stored in the memory means;

means for determining when the incoming call signal is no longer present by detecting the presence of a dial tone during the period beginning with determination by the comparator means that the incoming code signal received by the receiver means corresponds to the preselected security code stored in the memory means and ending before answering of any one of the telephones; and means, responsive to said means for determining, for switching the switching means to receive another incoming call signal when the means for determined determines the incoming call signal is no longer present.

2. The device of claim 1 further comprising control means, connected to the telephones in the telephone system, for activating and deactivating the device in response to a preselected control signal from any of the telephones.

3. The device of claim 2 wherein said switching means is responsive to the control means and provides the incoming call signal to the telephones during the period that the device is deactivated.

4. The device of claim 3 wherein the switching means comprises relay means for preventing the telephones from receiving the incoming call signal when the device is activated and the receiver means fails to receive an incoming code signal, for preventing the telephones from receiving the incoming call signal when the device is activated and the comparator means determines the incoming code signal received by the receiver means does not correspond to the preselected security code signal stored in the memory means, for connecting the telephones to the outside telephone service when the device is activated and the comparator means determines the incoming code signal received by the receiver means corresponds to the preselected security code signal stored in the memory means, and for connecting the telephones to the outside telephone service when the device is deactivated.

5. The device of claim 2 wherein the preselected security code signal includes a first code signal and a second code signal and wherein said control means comprises means for receiving the first and second code signals and for activating the device in response to receiving the first and second code signals.

6. The device of claim 5 wherein said switching means is responsive to the control means and prevents a particular incoming call signal from being provided to the telephones during the period that the device is activated whenever the particular incoming call signal is not accompanied with an incoming code signal corresponding to the preselected security code signal.

7. The device of claim 5 wherein the preselected security code signal further includes a third code signal different from the second code signal and wherein said control means comprises means for receiving the first and the third code signals and for deactivating the device in response to receiving the first and third code signals.

8. The device of claim 7 wherein the telephones each include a digital keypad connected to a DTMF generator and wherein said control means is responsive to a tone signal generated by actuating one or more of the keys of the digital keypad.

9. The device of claim 8 wherein the first, second, and third code signals are generated by actuating the numeral 8 key, the numeral 1 key, and the numeral 0 key, respectively.

10. The device of claim 1 wherein said switching means comprises ringing means, responsive to the incoming call signal, for providing a ringing signal to each of the telephones during the period beginning with determination by the comparator means that the incoming code signal received by the receiver means corresponds to the preselected security code signal stored in the memory means and ending with termination of the incoming call signal or answering of any one of the telephones, whichever occurs first.

11. The device of claim 1 wherein the device is at a location remote from the telephones.

12. A call signal screening deice for use with a telephone system including one or more telephones connected to outside telephone service in order to screen incoming all signals directed to the telephone system and for providing, in response to a preselected security code signal, the incoming call signals to the telephones, the device comprising:

memory means for storing the preselected security code signal;

receiver means for receiving the incoming call signal and an incoming code signal from the outside telephone service;

comparator means for comparing the incoming code signal received by the receiver means with the preselected security code signal stored in said memory means;

switching means, responsive to the comparator means, for providing the incoming call signal to one or more telephones when the comparator means determines the incoming code signal received by the receiver means corresponds to the preselected security code signal stored in the memory means;

ringing means, responsive to the incoming call signal, for providing a ringing signal to each of the telephones during a period beginning with determination by the comparator means that the incoming code signal received by the receiver means corresponds to the preselected security code signal stored in the memory means and ending with termination of the incoming call signal or answering of any one of the telephones, whichever occurs first;

means for determining when the incoming call signal is no longer present by detecting the presence of a dial tone during the period beginning with determination by the comparator means that the incoming code signal received by the receiver means corresponds to the preselected security code stored in the memory means, the ringing means is providing a ringing signal to each of the telephones, and ending before answering of any one of the telephones; and means, responsive to said means for determining, for disabling the ringing means when the means for determining determines the incoming call signal is no longer present.

13. The device of claim 12 wherein the ringing means comprises a ringing generator for generating the ringing signal.

14. The device of claim 12 wherein the ringing means comprises a relay for providing the ringing signal to each of the telephones during said period and for terminating the ringing signal being provided to the telephones in response to termination of the incoming call signal or answering of any one of the telephones.

15. The device of claim 12 further comprising control means, connected to the telephones in the telephone system, for activating and deactivating the device in response to a preselected control signal from any of the telephones.

16. The device of claim 15 wherein said switching means is responsive to the control means and prevents a particular incoming call signal from being provided to the telephones during the period that the device is activated whenever the particular incoming call signal is not accompanied with an incoming code signal corresponding to the preselected security code signal.

17. The device of claim 15 wherein said switching means is responsive to the control means and provides the incoming call signal to the telephones during the period that the device is deactivated.

18. The device of claim 17 wherein the switching means comprises relay means for preventing the telephones from receiving the incoming call signal when the device is activated and the receiver means fails to receive an incoming code signal, for preventing the telephones from receiving the incoming call signal when the device is activated and the comparator means determines the incoming code signal received by the receiver means does not correspond to the preselected security code signal stored in the memory means, for connecting the telephones to the outside telephone service when the device is activated and the comparator means determines the incoming code signal received by the receiver means corresponds to the preselected security code signal stored in the memory means, and for connecting the telephones to the outside telephone service when the device is deactivated.

19. The device of claim 12 wherein said determining means comprises a relay for switching the ringing means off when the receiver means no longer receives the incoming call signal.

* * * * *